United States Patent [19]

Cecka

[11] 4,157,181

[45] Jun. 5, 1979

[54] GRAPHITE FIBER TAPERED SHAFTS

[75] Inventor: Andrew M. Cecka, Thousand Oaks, Calif.

[73] Assignee: Fansteel Inc., North Chicago, Ill.

[21] Appl. No.: 914,921

[22] Filed: Jun. 12, 1978

Related U.S. Application Data

[63] Continuation of Ser. No. 684,181, May 7, 1976, abandoned.

[51] Int. Cl.$^2$ ...................... A63B 53/10; A63B 53/12
[52] U.S. Cl. .................................. 273/80 R; 138/130; 138/144; 156/195; 428/35; 428/367; 428/377; 428/902
[58] Field of Search ................. 428/367, 377, 902, 35; 138/130, 137, 144; 273/80 R, 80 B, DIG. 23; 156/195

[56] References Cited

U.S. PATENT DOCUMENTS 3,998,458  12/1976  Inoue et al. ........................ 273/80 R Primary Examiner—George F. Lesmes
Assistant Examiner—P. Thibodeau
Attorney, Agent, or Firm—Barnes, Kisselle, Raisch & Choate

[57] ABSTRACT

A novel structural member, such as a golf club shaft or other tapered tubular member, having an unusually high resistance to torsional deflection for given desired longitudinal deflections along with high strength and a center of gravity more favoring the tip-end is provided by a resin-bonded graphite fiber structure in which the fiber orientations in each layer of the multi-layer, composite structure are varied along the length of the shaft and in desired orientation relationships between layers to achieve the unique combination of properties.

This structural member is prepared by helically placing fiber yarns such as graphite onto a resin-coated, tapered steel mandrel by winding a series of high modulus graphite yarns in series of layers and progressively varying the rotational speed of the rings carrying the spools of the graphite fiber yarns in each layer as the mandrel is fed at a constant speed. The continuously varying rotational speeds of these rings and the wrapping angles to which the yarns are applied to the mandrel result in a unique structure achieved by optimizing the wrapping angles in each layer at desired progressive changes in fiber orientation different in each layer, and from layer to layer in the structure.

1 Claim, 13 Drawing Figures

WALL THICKNESS ALONG LENGTH OF GRAPHITE GOLF CLUB SHAFTS—"R" FLEX

WALL THICKNESS ALONG LENGTH OF GRAPHITE GOLF CLUB SHAFTS - "X" FLEX

TORSIONAL DEFLECTION ALONG LENGTH OF GRAPHITE GOLF CLUB SHAFTS. "X" FLEX

LONGITUDINAL DEFLECTION OF S-FLEX GRAPHITE GOLF CLUB SHAFTS OF THIS INVENTION FOR USE WITH VARIOUS IRON HEADED CLUBS COMPARED TO THAT FOR STEEL SHAFTS.

GRAPHITE FIBER TAPERED SHAFTS

This is a continuation of application Ser. No. 684,181, filed May 7, 1976, entitled "Graphite Fiber Tapered Shafts," now abandoned.

BACKGROUND OF THE INVENTION

This invention relates to a light weight, tapered tubular structure that provides superior performance for a wide variety of applications, especially in golf club shafts, but also in other products such as fishing rods, ski poles and other such applications. The invention also provides a method for making the unique structural member.

The outstanding characteristics and benfits that the structure of this invention offers over products of the prior art are especially described in this specification with reference to golf club shafts as an example. However, as will be readily apparent to those skilled in the art, the product and method for producing the product of this invention provide superior characteristics for many applications where a material is desired that provides low weight in combination with high strength, high resistance to torsional forces, various desired degrees of longitudinal flexure, high tip breaking strength, a center of gravity more favorably located toward the tip-end than in state-of-the-art products, along with excellent stability, good impact strength, long endurance life, and high fatigue strength.

Spirally wound or helically wound products per se are old in the art and have been used many years in producing products of fabrics and of fibers such as fiberglass, and more recently from more advanced fibers such as graphite. However, such spirally wound products typically are produced by simply winding the fibers at a uniform wrapping angle or wrapping speed in any given layer of the resulting structure. Such typical helically wound fiber shafts are described, for instance, in U.S. Pat. No. 2,573,361 and U.S. Pat. No. 3,457,692. There are also numerous references to fibers placed in layers on shafts or other tubular products, such as described in the above-mentioned patents. Other innovations in golf club shafts that show methods of construction used in the prior art can be found in U.S. Pat. Nos. 3,166,319; 2,822,175; 2,934,345; 3,313,541; 3,646,610, and related composite structures can be produced as described in U.S. Pat. No. 3,691,000.

None of these patents or any other known prior art specifically uses or claims the unique features of the new product of this invention, which achieves the following benefits over all products of the known prior art.

OBJECTIVES OF THE INVENTION

One principal object of this invention is to provide a tapered shaft in which the desired longitudinal deflection characteristics are achieved by the placement of the fibers with continuously varying helical wrapping angles along the longitudinal axis of the shaft.

Another object is to provide a tapered shaft in which the helical wrapping angles of fibers such as graphite are optimized by their continuous variation along the axis of the shaft in each layer, and from layer to layer in the structure to achieve the desired combination of properties.

A further object is to provide golf club shafts produced with continuously varying helical wrapping angles of the fibers such as graphite to achieve maximum torsional resistance, high tip breaking strength and low center of gravity in combination with high endurance strength for all of the desired longitudinal deflection characteristics.

A still further object is to provide tapered graphite shafts having superior weight distribution and uniformity of flexural curve qualities from shaft-to-shaft.

These and other objects of the invention will be evident by reference to the following drawings and description of examples of preferred embodiments.

Figure 1:
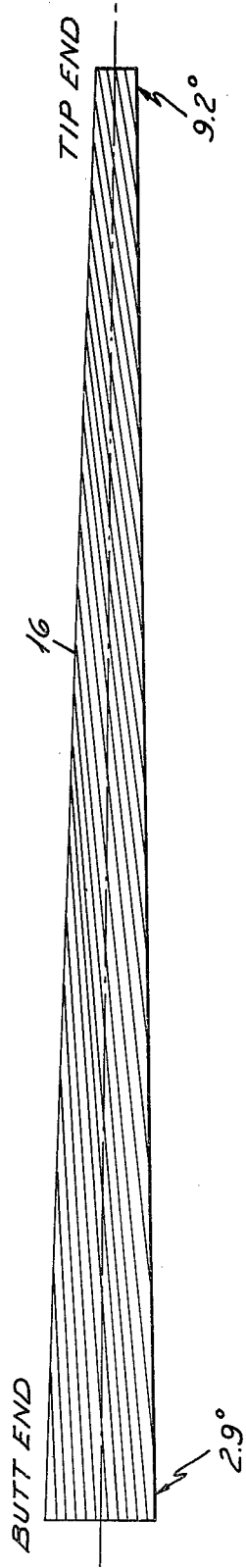
FIG. 1 is a side view of a golf club shaft of this invention. The head of the golf club, which may either be a wood or an iron head, is not shown at the tip-end of the club, nor is the wrapping of the butt or grip end of the club. The golf club heads and shaft wrapping are standard state-of-the-art components and do not constitute portions of the invention except as they contribute in combination to the usefulness of the product.
Figure 2:
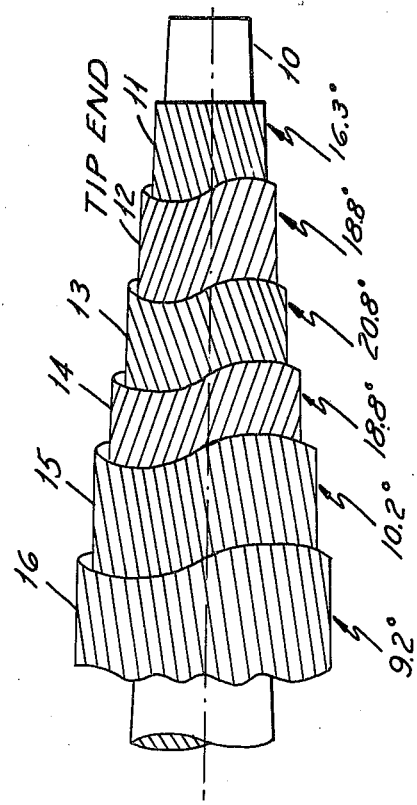
FIG. 2 is a cut-away, enlarged view at the tip of the golf club shaft illustrating the fiber orientation or helical wrapping angles of each of the six layers in a preferred embodiment of the invention.
Figure 3:
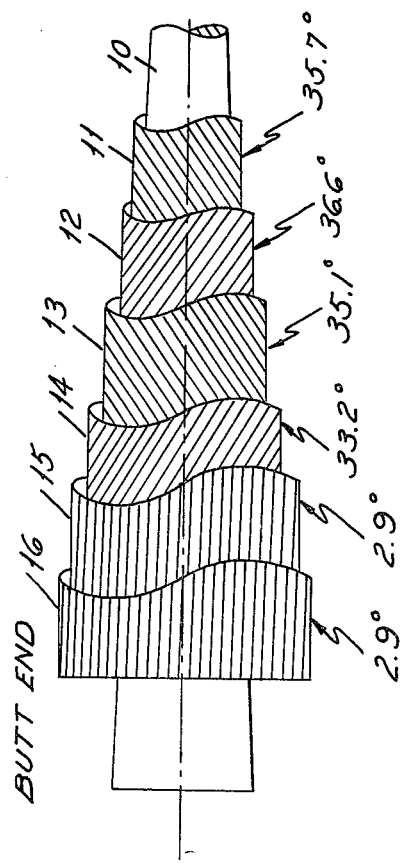
FIG. 3 shows a cut-away, enlarged view illustrating the helical wrapping angles in each of the six layers of a preferred embodiment at the butt end of the shaft.

The helical-wrapping angles illustrated in FIGS. 1, 2 and 3 pertain to shafts having an "S" flex (longitudinal deflection defined as a "stiff" shaft).

Figure 4:
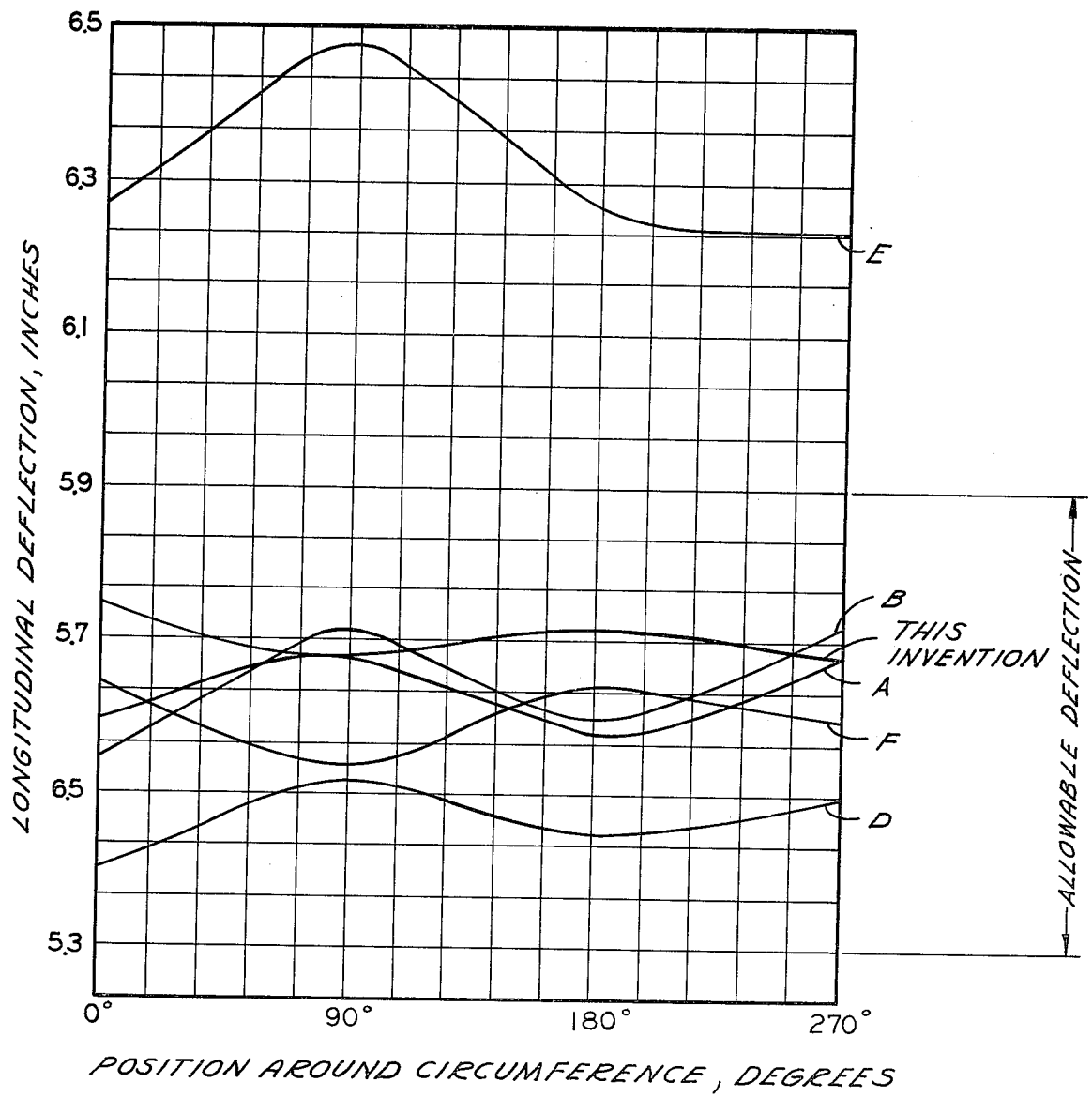

FIG. 4 shows the variation in longitudinal deflection around the circumference of "regular flex" ("R" flex) graphite golf club shafts of this invention compared to commercially produced graphite golf club shafts from a number of other commercial producers.

Figure 5:
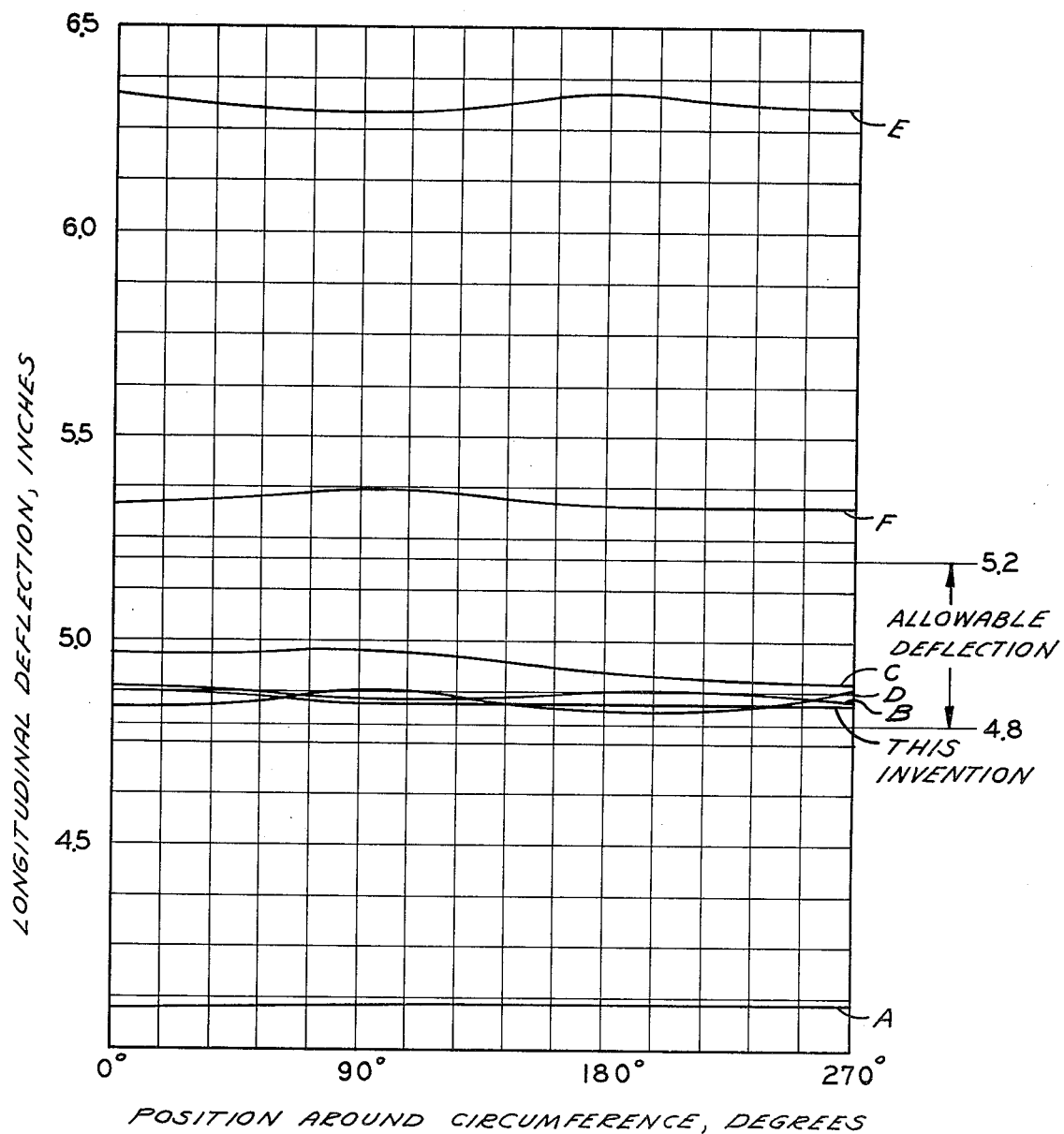

FIG. 5 is similar to FIG. 4 except that the data are shown for stiff shafts ("S" flex).

Figure 6:
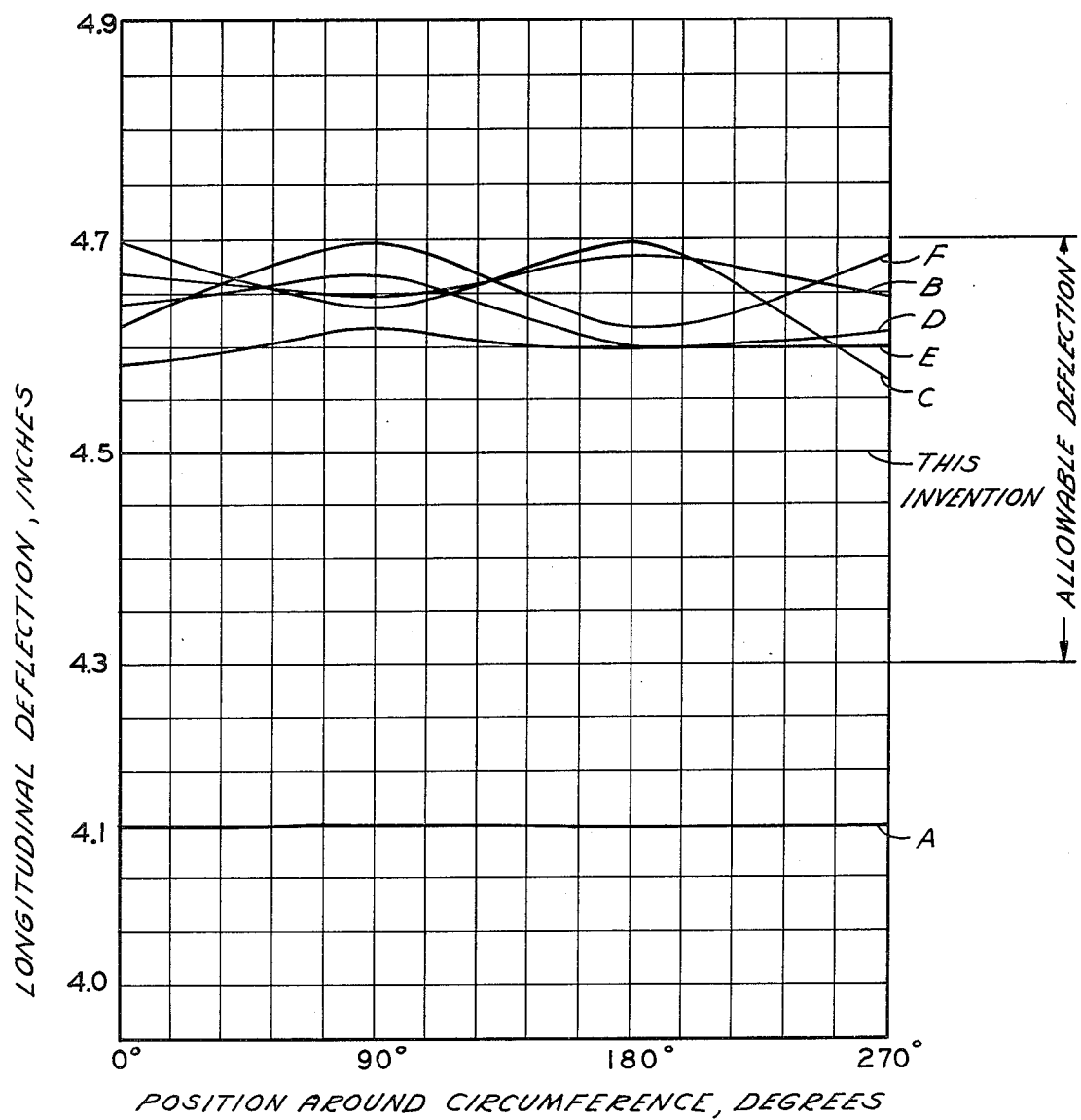

FIG. 6 is similar to FIG. 4 except that the data are shown for extra stiff shafts ("X" flex).

Figure 7:
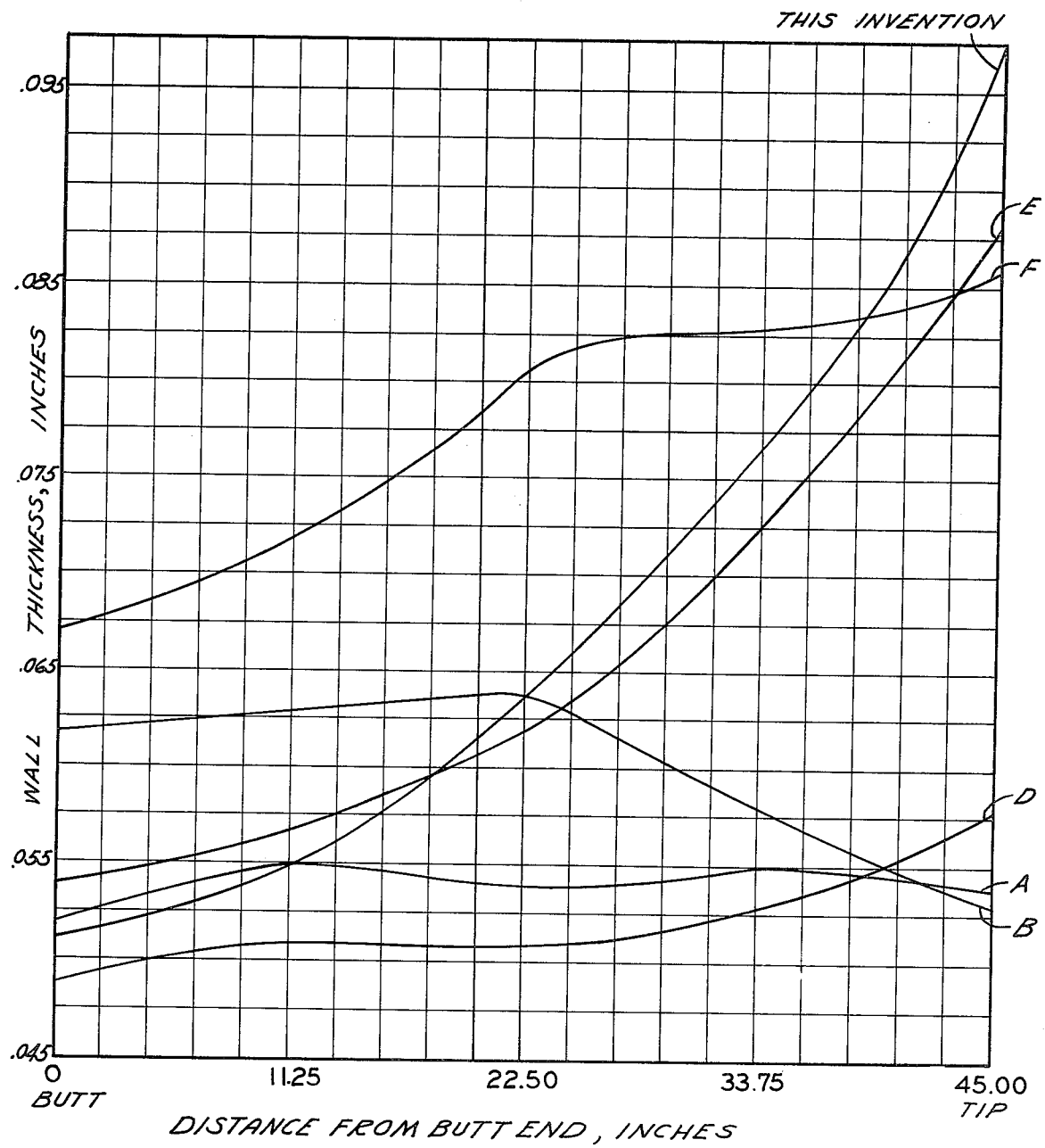
Figure 8:
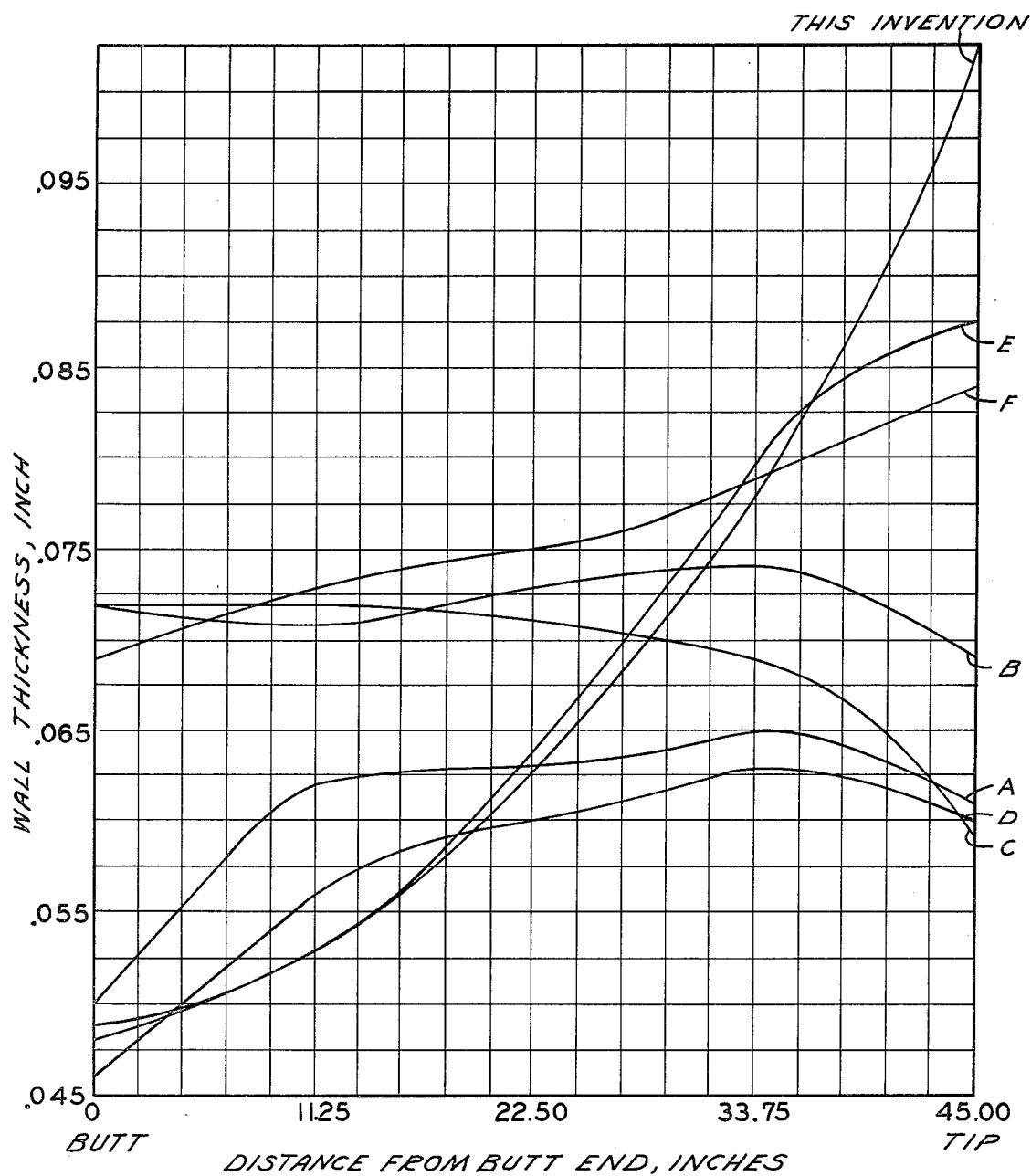
Figure 9:
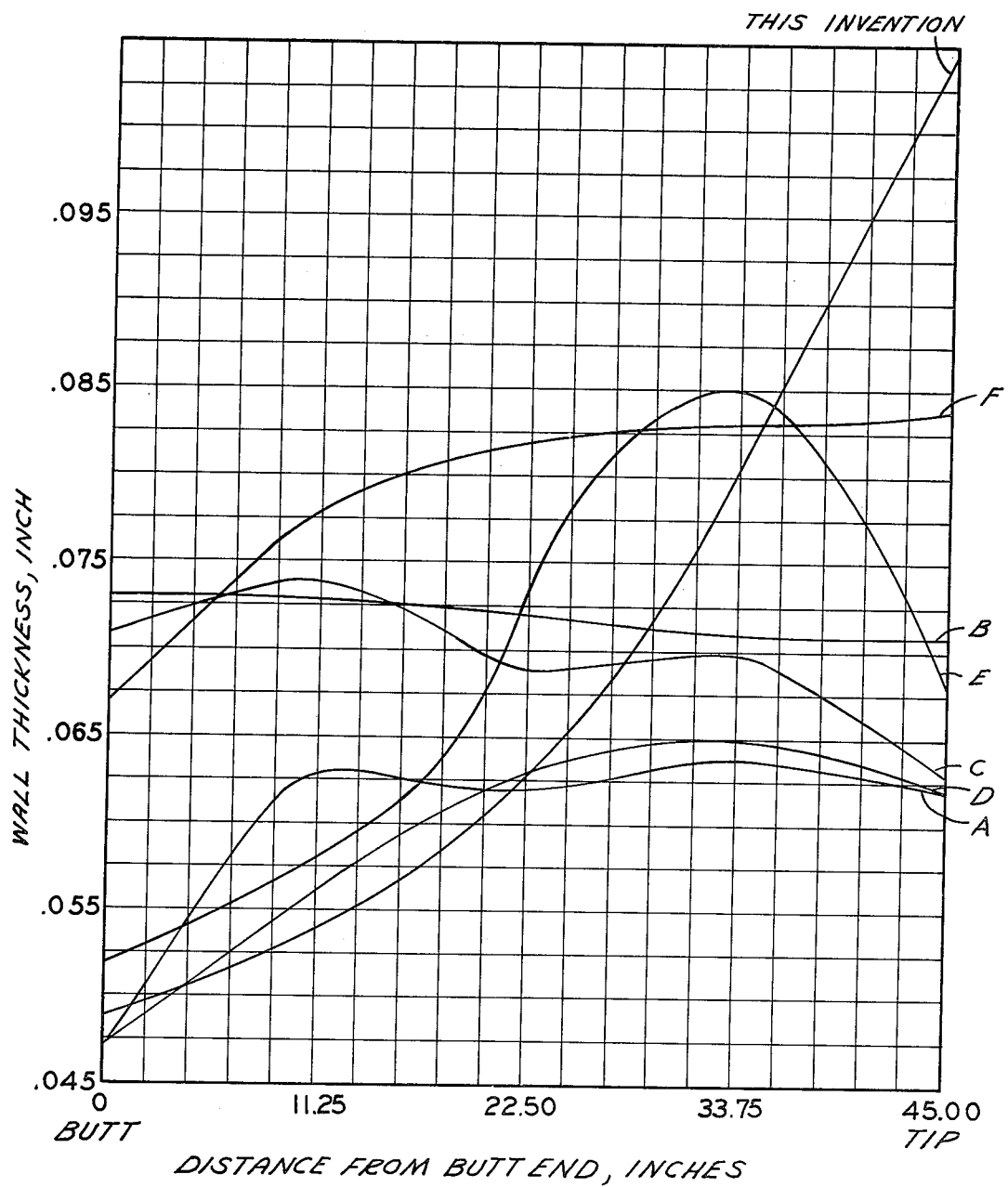

FIGS. 7, 8 and 9 show variations in wall thickness at different positions along the shaft length for graphite golf club shafts of this invention in comparison to commercially produced shafts in "R," "S," and "X" flexes, respectively.

Figure 10:
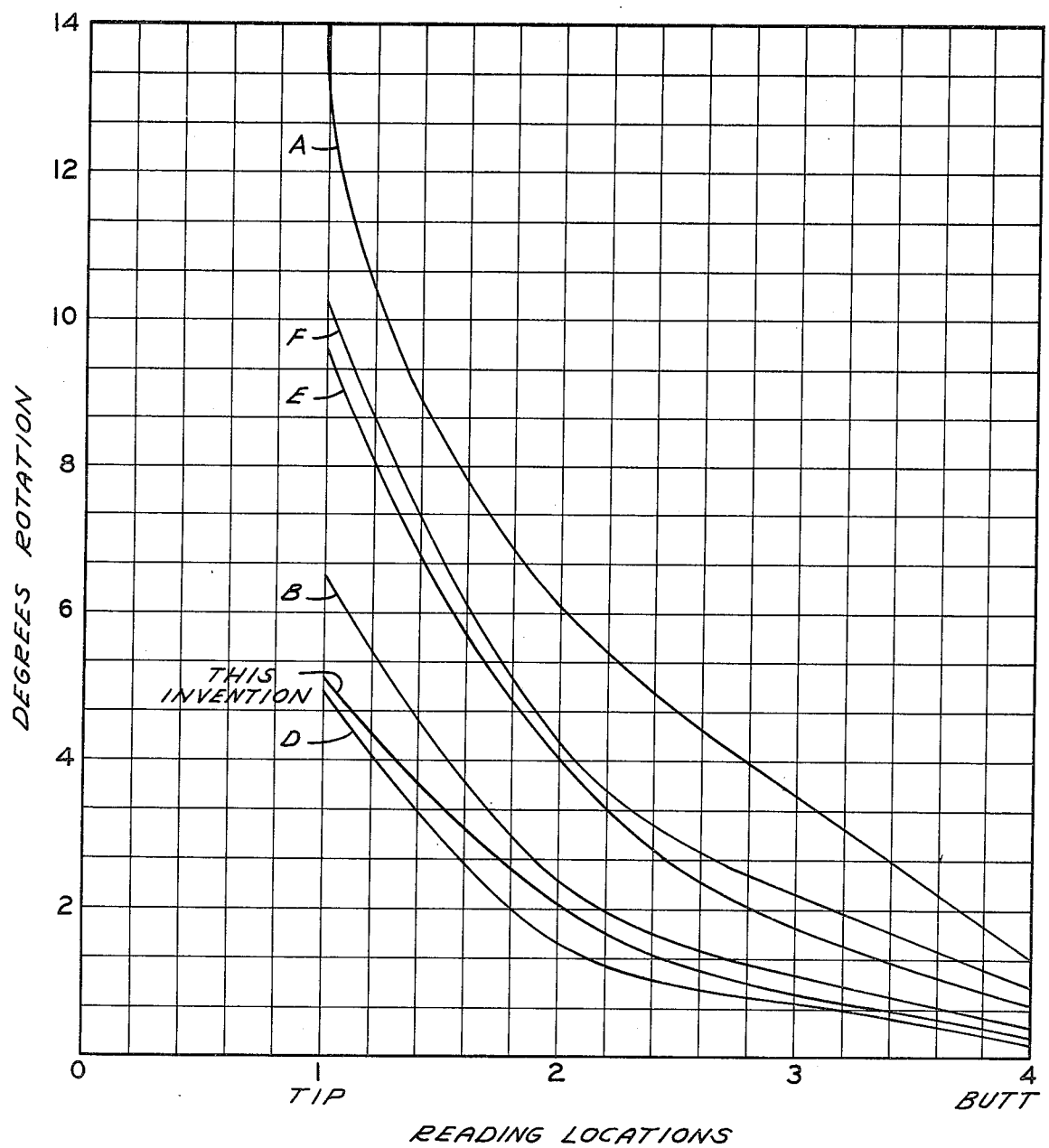
Figure 11:
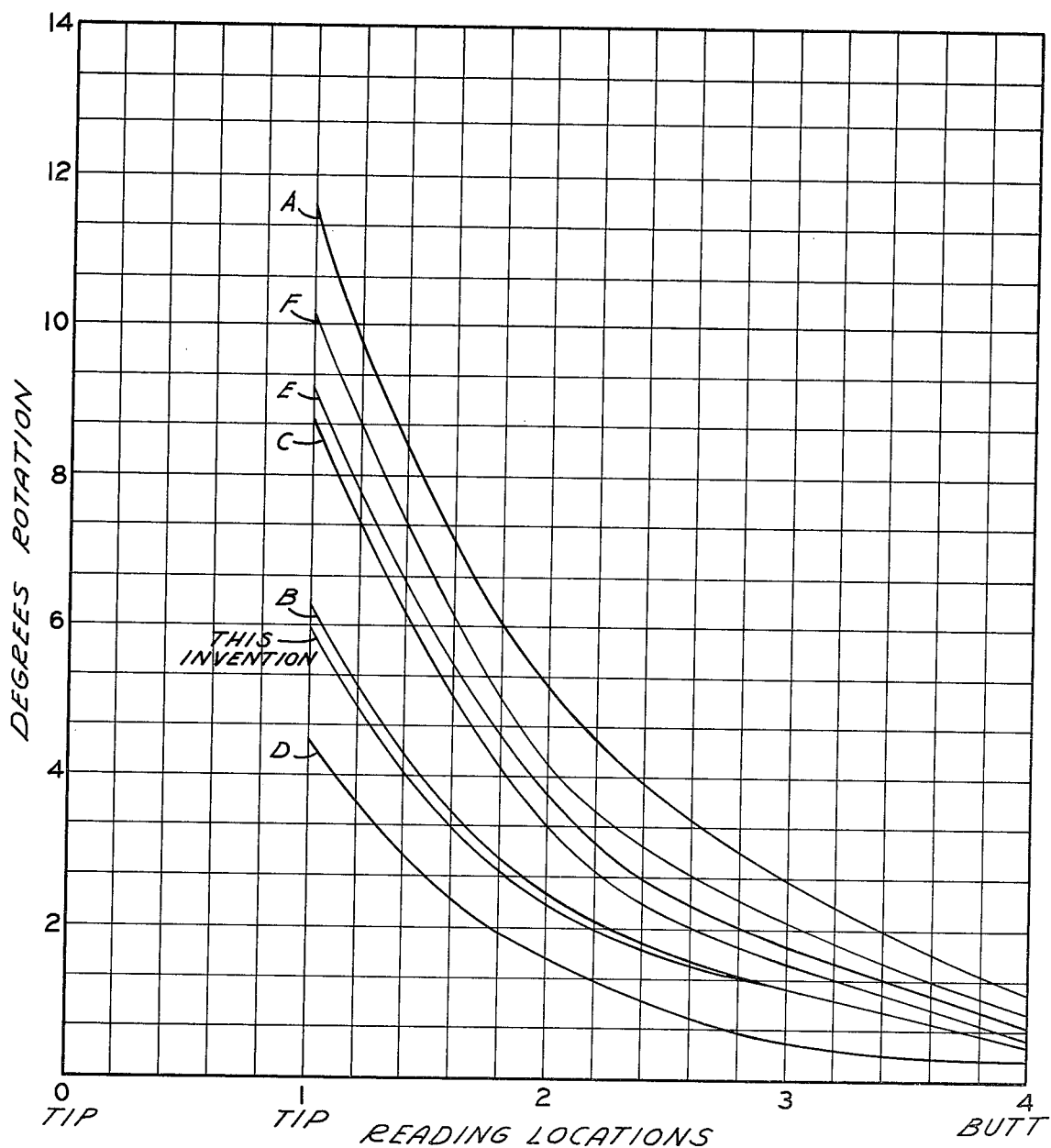
Figure 12:
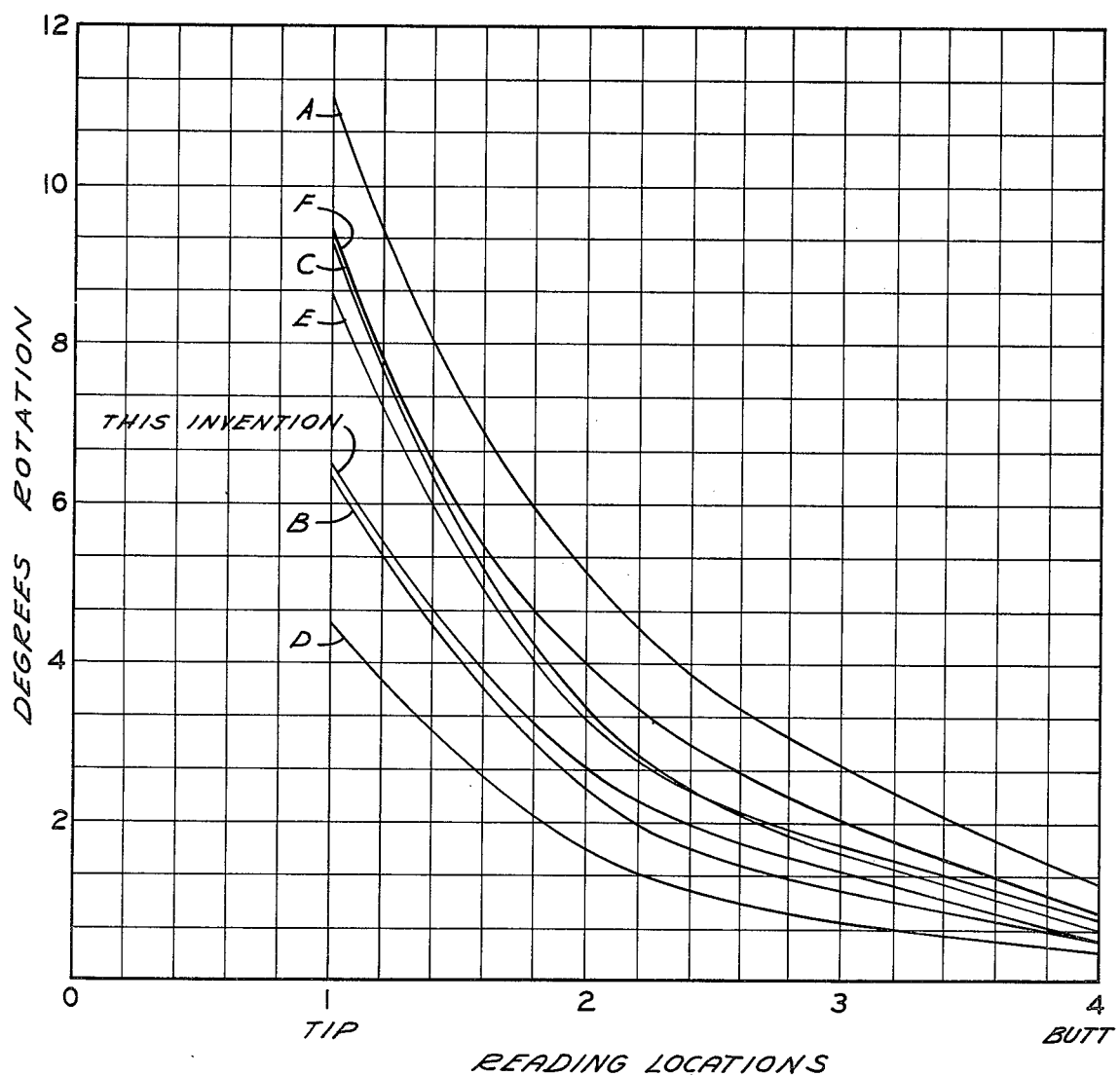

FIGS. 10, 11 and 12 show the variation of torsional deflection along the shaft length for graphite golf club shafts of this invention in comparison to other commercially produced graphite golf club shafts for "R," "S" and "X" flex shafts, respectively.

All of the above figures pertain to graphite golf club shafts intended for use with wood head clubs, generally referred to as No. 1 through No. 5 "woods."

Figure 13:
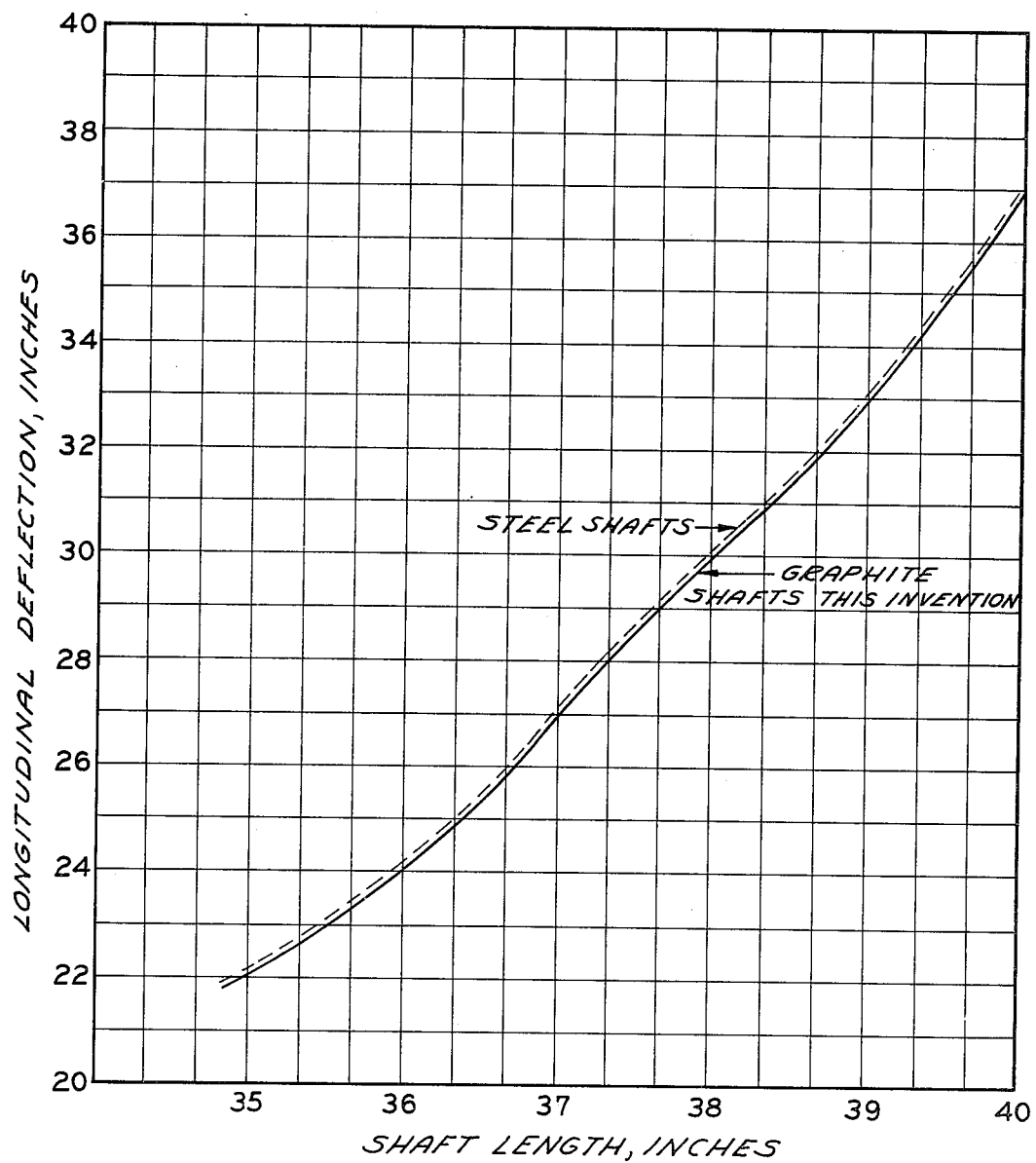

FIG. 13 shows the longitudinal deflection for "S" flex shafts of this invention intended for use with iron head clubs in comparison to commercially produced steel shafts for the same types of clubs. These iron clubs generally are referred to as No. 1 through 9 "irons," plus pitching wedges and sand wedges.

Definition of "Flex"

The term "flex" as used in golf terminology refers to the flexibility (or conversely, stiffness) of the golf club shafts. Generally, shafts are produced to about four different flexes: "A" flex, the most flexible, "R" flex, also called regular shafts; "S" flex, also called stiff shafts; and "X" flex, also called extra stiff shafts. These different flexes are produced to satisfy various player's preferences.

Any of these flexes (and a much wider range of flexes, if desired) can be produced in graphite shafts of this invention by: controlling the specific fiber wrapping angles in combination with varying the wrapping angles along the shaft length in each layer; by the number of fiber layers; and by the properties of the graphite fibers themselves.

The flex desired in the shaft is specified and controlled by the amount of longitudinal deflection exhibited under prescribed cantilever beam test conditions. The shaft is supported against an upper fulcrum (knife edge) which provides a downward thrust 2 inches from the butt end, and a lower fulcrum (knife edge) which serves as an intermediate support 5½ inches from the upper fulcrum. A load of 6 pounds is applied on the shaft near the tip at a position 34½ inches from the lower fulcrum (40 inches from the upper fulcrum and 42 inches from the butt end). The deflection of the shaft produced by this load is measured 1 inch beyond the load position (41 inches from the upper fulcrum and 43 inches from the butt end), and is recorded as the "flex" of the shaft.

The nominal longitudinal deflections, and allowable range (minimum and maximum allowable values) for "A," "R," "S," and "X" flex shafts of products of this invention are specified and discussed later. These deflection values generally are similar to those for state-of-the-art steel shafts of the same designated flexes.

BRIEF DESCRIPTION OF PROCESS FOR PRODUCING SHAFTS OF THIS INVENTION

A unique filament winding machine was constructed to achieve the variable fiber orientations in tapered tubular products of this invention. The machine was constructed by Goldsworthy Machine Company following some of the technology developed in U.S. Pat. Nos. 2,871,911; 3,566,888; 3,674,601 and 3,579,402 assigned to Goldsworthy; however, a number of new features, techniques and improvements specified by Fansteel Inc. (assignee of the present application), were incorporated and added to achieve the products of this invention.

The overall height of the machine is about 20 feet. It is designed to produce golf club shafts at a rate of travel up to about 50 inches per minute. The golf club shafts for "woods" are produced to a standard final length of 45 inches, so the shafts are produced in the machine at about the rate of one per minute. The golf club shafts are produced by winding graphite fibers onto tapered, ground steel mandrels which are fed vertically from the top, one after another, on a continuous basis. The mandrels are gripped with automatically releasing gripping devices, which are mounted on one roller sprocket near the upper platform of the machine and on another roller sprocket near the bottom of the machine. The mandrels are solid steel rods ground to establish a precise taper and the necessary surface finish for the operation. Inside dimensions of the golf club shaft, as related to dimensions of the mandrel, are about 0.500" at the butt (or grip) end tapering to about 0.100" at the small tip (or head) end.

The mandrels are 50 inches total length, with a uniformly tapered section 38-inch length starting at the tip, a constant diameter, 9-inch length section at the butt end, plus a notched 3-inch length section for the transition from shaft to shaft.

Legs about 7 feet tall support the frame in the machine, which carries a series of rings that hold the spools of graphite yarn. The central portion of the machine containing the rings is about 88 inches tall and 70 inches in diameter. The machine is designed to have 10 rings, each containing up to 12 spools of graphite yarn, or a total of 120 spools. Not all of these necessarily need be used. In a typical embodiment of this invention, the graphite filament yarns (also called "tows") are applied in six layers. Various sizes of yarns in combination with other numbers of layers can be used to achieve the desired properties in the final product.

Each spool of graphite yarn contains from 1.7 to 3.0 pounds of continuous filament tows. Each helically wound golf club shaft for wood headed clubs according to preferred embodiments of this invention has a typical weight of about 90 grams, of which about 60 grams is graphite fibers and the balance is an epoxy resin. A total of 58 to 60 spools of graphite yarn are placed in the winding machine, and are used in the helical winding of the shafts. Therefore, there is a sufficient amount of graphite fiber yarn on these spools to wind typically about 800 shafts with two-pounds of graphite yarn per spool. Restated, the length of continuous fiber yarn on each spool can be used continuously without interruption in winding typically about 800 shafts.

These graphite spools are located, as desired, on some or all of 10 concentric, flat rotating rings mounted on the frame of the machine. Each rotating ring typically carries from 8 to 12 nominally two-pound spools of graphite yarn. These rotating graphite spool-carrying rings are electronically driven, but at rates that are independent on each other in order to achieve the specific helical wrapping angles in a contiguously consistent and sequential pattern. Each ring is programmed independently to provide the necessary compensation to achieve a variable helical wrapping angle by its own DC/SCR motor, which is, in turn, controlled as to its own cyclical changing rate by a cam driven potentiometer system. The cams can be linearly programmed to provide a constant rate of change of helical wrapping angles for any given ring, or a more complex, non-linear cam can be used. Such non-linear cams can be used to produce shafts of this invention having specifically designed deflection curves for a given flex, and a specific desired location of a flex point (sometimes called "kick point" in a golf terminology) to suit players' preferences. The rings can be counterrotated to provide opposite angle layers of fibers on alternate layers, or they can be rotated in the same clockwise or counterclockwise direction.

The mandrels are fed with the small or tip end down, and are coated with a uniformly applied layer of melted epoxy resin. The speed of driving the mandrels is held constant. However, the rotational speed and direction of the rings containing the graphite spools is varied accordingly to precisely established programs. The graphite filament yarns pay-off from the spools and feed through wear resistant guide tubes and through a polished wear resistant fiber direction changing annular ring onto the epoxy coated mandrels. The melted epoxy resin is forced radially outward, layer by layer, as the wrapping proceeds.

Other methods of applying the epoxy resin can be used, such as dipping the bare mandrel into a bath of melted epoxy resin, allowing the resin to dry, then inserting the mandrel into the feed-through mechanism for winding. Just prior to winding of the first layer of graphite tow, the mandrel passes through a heating zone (such as an induction heating coil) where the mandrel is heated to a temperature which remelts the epoxy coating. In addition, graphite tow preimpregnated or coated with resin can be utilized.

After all of the graphite tows are wound on the mandrel, the shaft feeds through a wiper which insures that the epoxy completely impregnates the fibers, provides a smooth surface, and removes excess resin. Then at least one and normally about six layers of a lagging tape of a material such as Tedlar, cellophane or other suitable shrink tape is spirally wound on the shaft. Finally, the wrapped graphite tow plus epoxy shaft is removed from the machine. Then the shafts are baked at about 230° F., then at 300° F., to cure and harden the epoxy resin, the tapered mandrel is removed, the lagging tape is stripped by peeling, the shaft is cut overlength by trimming both ends, the shaft is lightly centerless sanded using an abrasive belt, a surface coating such as polyurethane resin or other suitable coating is applied to obtain a glossy surface layer for esthetics and to provide improved resistance to scuffing, and the ends of the shaft are cut to obtain the final diameter and length of the shaft.

Graphite Fibers

Various commercially available graphite fibers from several producers can be used to make products of this invention. One especially preferred graphite fiber product is Thornel "300" graphite yarn, grade WPY 30 1/0, produced by Union Carbide Corporation. Properties of Thornel 300, shown in Table I, are summarized from the producer's data sheet.

TABLE I

| Properties of Preferred Graphite Fibers for Products of This Invention | | |
|---|---|---|
| | Fiber Designation | |
| | Thornel "300" Graphite Yarn Grade WPY 30 1/0* | Magnamite Graphite Fiber Type AS-2** |
| Nominal Filament Dia., microns | 8 | 7.8–8.1 |
| Density, Avg., lb/in$^3$ | 0.063 | 0.0645–.0660 |
| Ultimate tensile strength, 10$^3$ psi, | 360 (nominal) | 410 (minimum) |
| Modulus of Elasticity, 10$^6$ psi, | | |
| Nominal | 32.9 | — |
| Range | 30.0–34.5 | 30–34 |

These and other data on the graphite fibers can be found in:
*"Thornel" 300 Graphite yarn, Grade WYP 30 1/0, Bulletin No. 465-223, Union Carbide Corporation
**"Magnamite" Graphite Fiber (Continuous Filament), Product Data No. 831-1, Hercules Incorporated The graphite yarn is sometimes referred to as "tows" or "strands". The individual graphite fibers in the Thornel 300 yarn are about 8 μm (about 0.0003 inch) diameter, and have a modulus of elasticity of about 33,000,000 psi. About 3000 filaments are assembled in 1 yarn, and 4 of these yarns (12,000 individual graphite filaments) are put together into the final yarn, which is thus comprised of four-end roving without twist or catenary. It is obtained with a UC309 finish, which includes an epoxy compatible sizing.

Another preferred graphite fiber product is Magnamite AS-2, produced by Hercules Incorporated. Properties of the Magnamite AS-2 are also shown in Table I, and are summarized from the producers' data sheet. The individual graphite fibers in the AS-2 are generally slightly larger in diameter than in the Thornel 300 yarn. The type AS-2 fibers have a modulus of elasticity of about 30-34,000,000 psi, and are assembled into an epoxy sized yarn or tow containing about 10,000 individual graphite fibers to provide the final yarn or tow on the spools.

Variable Orientation Helical Wrapping

A computer program was conducted to determine the optimum placing or wrapping angles (helical angle with respect to tangency to the axis of the mandrel), how this wrapping should be varied along the length of the shaft, the number of layers of graphite fibers, the desired dimensions of the shaft, and the specific properties of the graphite fiber plus resin composite structure. In this computer program, the objective was to determine the combinations that gave the various desired flexes while simultaneously minimizing torsional deflection, providing a stiff and strong tip, achieving a center of gravity favoring the tip-end of the shaft, and proper dimensional control in the finished shaft. These calculations then were used as the initial conditions for actual winding of shafts on the above-described winding machine in order to further establish the preferred variable helical wrapping conditions for each desired flex. The term "helical" winding is defined for the purpose of this application as referring to angles of spiral winding up to an angle of 45° with respect to the centerline of each tubular product, or to the mandrel on which the fiber tows are wound. The fiber tows are wound under tension produced by friction brakes on the fiber spools in combination with friction with the guide tubes through which the tows pass. These guide tubes are located between the spools of fiber tows and the mandrel.

In the preferred embodiments, six layers of graphite fiber yarn wrapping were optimum to achieve desired characteristics in the final shafts. The inner four basic layers represent the torsional resistant components, and are wrapped with larger helical angles, which are progressively varied along the shaft length in a programmed manner for this purpose.

With reference to FIGS. 1, 2 and 3 of the drawings, the external appearance of a wound "S" flex shaft is shown in FIG. 1. The shaft is shown foreshortened and generally is wound on a mandrel having a length of about 50 inches with a uniformly tapered section 38 inches in length. The tip end of the mandrel is usually about 1/5 the diameter of the butt end. In FIG. 1, the "S" flex has an outer covering or layer of wrapped fibers varying from 2.9° helical angle at the butt end to 9.2° helical angle at the tip end.

In FIG. 2 is a diagrammatically presented cut-away layer section of the tip end of an "S" shaft. The mandrel 10 is shown with a first layer 11 disposed at the tip end at a counterclockwise 16.3 helical angle as in Example 1 of Table II. The second layer 12 is clockwise at 18.8° helical angle. The third layer 13 has a 20.8° helical angle counterclockwise. The fourth layer 14 has a clockwise helical angle of 18.8°.

In FIG. 3, the respective layers 11 to 14 are shown at the butt end with helical angles, respectively, of 35.7°, 36.6°, 35.1° and 33.2°.

The outer layers 15 and 16 in FIGS. 2 and 3 are both counterclockwise and have a starting angle of 10.2° and 9.2° respectively at the tip end which moves down to 2.9° helical for both layers at the butt end. It will be noted that these drawings are not dimensionally accurate because of the need to display the various layers. Table II gives three other examples of wrapping angles.

It will be appreciated that wrapping fibers on a mandrel with a tapered shape will cause differing angles from one end to the other. The present invention includes changing the wrapping speed to build on the taper variation to bring the desired result.

tially uniform diameter of 0.500 inch, with a taper of 0.002 inch per inch draft angle to facilitate removal of the mandrel.

TABLE II

Variable Helical Winding Programs to Produce Graphite Golf Club Shafts of This Invention Having Different Flexes

| Example No. | Desired Flex | Layer No. | No. Graphite Spools/Ring | Direction of Ring Rotation | Ring Rotational Speed, RPM | | Helical Angle, Degrees (Nominal) | |
|---|---|---|---|---|---|---|---|---|
| | | | | | Tip | Butt | Tip | Butt |
| 1 | S | 1 | 8 | Counterclockwise | 31.3 | 21.7 | 16.3 | 35.7 |
| 1 | S | 2 | 9 | Clockwise | 28.2 | 20.4 | 18.8 | 36.6 |
| 1 | S | 3 | 9 | Counterclockwise | 30.4 | 20.7 | 20.8 | 35.1 |
| 1 | S | 4 | 10 | Clockwise | 22.8 | 18.9 | 18.8 | 33.2 |
| 1 | S | 5 | 12 | Counterclockwise | 11.2 | 1.6 | 10.2 | 2.9 |
| 1 | S | 6 | 12 | Counterclockwise | 8.5 | 1.6 | 9.2 | 2.9 |
| 2 | X | 1 | 8 | Counterclockwise | 28.4 | 20.0 | 14.8 | 31.7 |
| 2 | X | 2 | 9 | Clockwise | 26.0 | 17.7 | 16.7 | 31.0 |
| 2 | X | 3 | 9 | Counterclockwise | 29.3 | 16.6 | 20.3 | 27.2 |
| 2 | X | 4 | 10 | Clockwise | 21.8 | 14.7 | 18.2 | 26.0 |
| 2 | X | 5 | 12 | Counterclockwise | 7.0 | 1.02 | 6.5 | 1.7 |
| 2 | X | 6 | 12 | Counterclockwise | 5.3 | 1.02 | 5.6 | 1.7 |
| 3 | R | 1 | 8 | Counterclockwise | 35.0 | 24.5 | 18.3 | 37.5 |
| 3 | R | 2 | 8 | Clockwise | 33.0 | 23.1 | 19.6 | 36.4 |
| 3 | R | 3 | 9 | Counterclockwise | 31.8 | 22.9 | 24.3 | 28.7 |
| 3 | R | 4 | 9 | Clockwise | 28.0 | 23.0 | 22.4 | 37.1 |
| 3 | R | 5 | 12 | Counterclockwise | 14.2 | 1.93 | 12.6 | 3.5 |
| 3 | R | 6 | 12 | Counterclockwise | 10.6 | 1.93 | 11.3 | 3.5 |
| 4 | A | 1 | 8 | Counterclockwise | 36.9 | 25.7 | 19.3 | 39.0 |
| 4 | A | 2 | 8 | Clockwise | 34.9 | 24.5 | 20.8 | 38.2 |
| 4 | A | 3 | 9 | Counterclockwise | 32.1 | 24.3 | 24.7 | 40.6 |
| 4 | A | 4 | 9 | Clockwise | 29.0 | 23.8 | 23.3 | 38.3 |
| 4 | A | 5 | 12 | Counterclockwise | 20.0 | 3.86 | 17.5 | 7.7 |
| 4 | A | 6 | 12 | Counterclockwise | 15.0 | 3.86 | 14.8 | 7.7 |

In preferred embodiments of products of this invention, Thornel 300 yarn has been found to be the preferred graphite fiber material for use on the inner four, torsional resistant components because of the smaller size and smoother finish of the yarn. Magnamite type AS-2 graphite fiber tows have been found to be the preferred graphite fiber material for the outer two layers because they provide a better and more uniform coverage in the outer layers than other graphite materials evaluated.

Generally the outer two fiber layers are wound in a counterclockwise direction to provide maximum resistance to torsion at the point of impact with the golf ball when the shafts are used by right-handed players. However, these layers can be applied equally well with a clockwise final orientation to optimize the shaft characteristics for left-handed players as well.

EXAMPLES

Example 1

The techniques used to produce "S" flex graphite golf club shafts of this invention are summarized in Table II, which lists the helical wrapping angles beginning at the tip end and varying progressively along the length of the shaft to achieve the final fiber orientations shown at the butt end. Data on the number of graphite fiber spools used on each ring, direction of rotation, and rotational speeds used at the tip and butt also are included in Table II.

To produce an "S" flex shaft, 50 inch length tapered mandrels were loaded with the tip end down at the top of the machine. The steel mandrels had a smooth ground finish tapering from a diameter of 0.100 inch at the tip and increasing linearly to a diameter of 0.500 inch at a distance of 38 inches upward along the mandrel, while the last section of the mandrel had an essentially uniform diameter of 0.500 inch, with a taper of 0.002 inch per inch draft angle to facilitate removal of the mandrel.

The epoxy resin was preheated to 95° to 105° F. to facilitate uniform flow and fiber impregnation. The resin was applied uniformly onto the vertically descending mandrel just before it proceeded into the winding zone. The mandrel vertical downward speed was controlled at 50.0 inches per minute.

The rotating ring for applying the first layer of graphite fiber tows was loaded with 8 spools of graphite tows of Thornel 300 yarn symmetrically located around the circumference of the ring. The speed of the ring applying the first layer of 8 graphite fiber tows was initially 31.3 rpm at the tip end, and was progressively decreased to 21.7 rpm at the butt end of the mandrel by means of the cam control on the winding machine. This combination of linearly decreasing rotational speed and the linearly increasing diameter of the mandrel resulted in a helical wrapping angle starting at 16.3 degrees tangent to the axis of the mandrel at the tip end and increasing progressively to 35.7 degrees at the butt end. The first ring was rotated counterclockwise with respect to the axis of the mandrel as viewed vertically downward on the machine.

The second rotating ring carried nine spools of graphite fiber tows symmetrically spaced around the circumference. This ring was operated clockwise under the rotational speed conditions that result in the fiber wrapping angles at the tip and butt ends of the shaft as listed in Table II. These fiber tows also were Thornel 300.

The third rotating ring carried nine spools of Thornel 300 fiber tows, and was operated counterclockwise under the rotational speed conditions to achieve the wrapping angles at the tip and butt listed in Table II.

The fourth ring carried ten spools of Thornel 300 fiber tows, and was operated in a clockwise direction with a progressively decreasing speed from the tip to the butt end to achieve the helical wrapping angles at tip and butt listed in Table II.

The fifth ring had twelve spools of Magnamite type AS-2 graphite fiber tows spaced symmetrically around the ring, and was operated counterclockwise at progressively varying rotational speeds to achieve the helical wrapping angles at the tip and butt listed in Table II.

The final ring, number six, for applying the last layer of graphite fibers also had twelve spools of the Magnamite type AS-2 fiber tows located symmetrically around the ring. The final layer was applied by rotating the ring at a speed of 8.5 rpm at the tip end and progressively decreasing the speed to 1.6 rpm at the butt end to achieve helical wrapping angles ranging from 9.2 degrees at the tip to 2.9 degrees at the butt end.

As each layer of graphite fiber tows was applied one after another, the epoxy resin was forced gradually outward, and coated and bonded the layers of fibers into a unified, layered structure.

Then the wrapped mandrel proceeded through an orifice wiper which removed any excess epoxy resin and provided a smooth finish; the wiper also aided in insuring that the epoxy resin had completely penetrated and coated the entire cross section of the wound graphite fibers.

Next, the wiped, fiber wound structure passed through a zone where shrink tape was wrapped around the shaft. Tedlar tape, 0.0005-inch thickness by 1-inch width was applied from rolls on two planetary machines mounted 180 degrees apart and rotated around the mandrel as it descended. The function of this lagging system was to provide molding pressure to the wound shaft during the subsequent curing treatment. This was accomplished by winding six plies of the Tedlar shrink tape over the graphite composite in a staggered pattern with a uniform overlap. Sufficient tension was applied to the tape during wrapping to gently stretch the tape so that it would continuously conform to the varying helical contact.

Then the wrapped mandrel assembly was removed from the machine and hung in an oven for 20 minutes at 230° F., followed by one hour at 300° F. to cure and harden the epoxy resin.

After the curing treatment, the mandrel was removed; the Tedlar tape was stripped by peeling; both ends of the shaft were trimmed intentionally leaving excess length material on both ends; the outside diameter was sanded parallel to the exterior taper of the shaft using a 320 grit belt on a belt sander; the surface was wiped clean, and a thin uniform coating of polyurethane resin was applied to the surface; and then both ends of the shaft were cut to achieve the proper diameters and a length of 45 inches.

A total of 188 shafts were produced under these conditions of wrapping angles.

Each shaft was tested for longitudinal deflection as described previously under the heading of "Definition of Flex." The longitudinal deflection was found to be in the range of 4.8 to 5.2 inches in all cases, and averaged 5.0 inches. These values met the criteria desired for the longitudinal deflection for "S" or stiff flex shafts.

Example 2

Variable orientation graphite fiber tow, helically wound, tapered golf club shafts having an "X" or extra stiffness flex were produced using the appropriate rotational speeds on the rings to produce the wrapping angles listed in Table II for "X" flex shafts. The same number of graphite fiber tows were used in the rings as were described under Example 1 for "S" flex shafts.

The same procedures were used for the remainder of the processing steps for producing the "X" flex shafts as were described in Example 1.

A total of 105 shafts were produced under the conditions of Example 2. Longitudinal deflection data were determined on these shafts by the method described in Example 1. The longitudinal deflection of the shafts was found to range from 4.3 to 4.7 inches, and averaged 4.5 inches, which meet the criteria desired for "X" or extra stiff shafts.

Example 3

The ring rotational speeds that were used to produce "R" or regular flex shafts are listed in Table II along with the helical wrapping angles that occurred. For producing the "R" flex shafts, eight spools of graphite fiber yarn were symmetrically spaced around the first ring, eight spools on the second ring, nine spools on the third ring, and nine spools on the fourth ring, all using the Thornel 300 yarn. The outer two layers, 5 and 6, were produced using twelve spools of graphite fiber yarn on each ring, using Magnamite type AS-2 fiber tows.

The same procedures were used for the remainder of the processing steps for producing the "R" flex shafts as were described in Example 1.

A total of 102 shafts of the "R" flex were produced under the above described wrapping conditions. The longitudinal deflection, as determined by the method of Example 1, ranged from 5.3 to 5.9 inches, and averaged 5.6 inches, which met the criteria established for the desired longitudinal deflection of "R" or regular flex shafts.

Example 4

The helical wrapping angles corresponding to the ring rotational speeds and other operational parameters are listed in Table II for "A" flex shafts that were produced. The same number of spools per ring and types of graphite fibers as were used in producing the "R" flex shafts as in Example 3 were used for producing the "A" flex shafts in Example 4.

The same procedures were used for the remainder of the processing steps for producing "A" flex shafts as were described in Example 1.

A total of 91 shafts were producing using the above described helical wrapping conditions for "A" flex shafts. The longitudinal deflection, as determined by the method outlined in Example 1, was found to range from 6.0 to 6.6 inches, and averaged 6.3 inches, which met the criteria established for the desired longitudinal deflection for "A" flex shafts.

Example 5

Helically wound, variable orientation graphite fiber tapered shafts were produced that met the desired longitudinal flexes using the conditions given in Examples 1 through 4, except that markers of colored yarn were incorporated to replace one or more of the twelve spools of graphite fiber tows in the sixth ring that applied the outer layer of fibers. Various textile yarns such as nylon and other filament materials in colors such as gold, silver, red, blue and white, singly or in combination, were helically wound into the external layer of the graphite fiber structure to provide distinctive esthetic appearance without introducing any significant or measurable effect on the longitudinal deflection, or on other property characteristics measured on the shafts and described in subsequent sections in comparison to other shafts.

The same procedures were used for the remainder of the processing steps for producing shafts containing the markers of colored yarns as were described for the various flex shafts in Examples 1, 2, 3 or 4, as appropriate.

Thus, with reference to Table II, it will be seen that the basic (four inner) layers which can be counterclockwise and clockwise, or clockwise and counterclockwise, vary in angles and cross-angles from about 14.8° at the tip to 40.6° at the butt. Thus, a range of about 13° to 45° is contemplated. In the clockwise or counterclockwise external layers, the angles vary from 17.5° at the tip to 1.7° at the butt. Thus, a range of 1° to 18° is contemplated for these layers.

Comparative Data on Graphite Golf Club Shafts

Various properties of the golf club shafts of this invention were compared to state-of-the-art graphite and steel golf club shafts to demonstrate the generally superior characteristics achieved by products of this invention. Obviously, it is physically impossible for any shaft to excel all others in every measurable characteristic since trade-offs must be made in some characteristics to attain superiority in others; but with respect to a number of important characteristics generally desired in golf club shafts, the following discussion will show the overall improved or superior characteristics achieved in the golf club shafts of this invention.

State-of-the-art graphite golf club shafts were obtained from six other commercial producers of graphite shafts, and were designated by the codes A, B, C, D, E and F. None of these state-of-the-art shafts were believed to have been produced by a filamentary yarn helical winding technique, but had been produced instead by roll-up or wrap-up methods. In such methods, unidirectional graphite tape or cloth, which is impregnated with the resin used, is rolled or spiraled around a tapered steel mandrel similar to the procedure used in a hand operated cigaret roller, or similar to the Tedlar lagging tape winding method described in Example 1, or other similar well-known state-of-the-art methods. In these roll-up shafts, several layers of the graphite fiber tapes or sheets are oriented as cross-plys to achieve, for example, ±45 degree fiber orientation with respect to the axis of the mandrel.

1. Variation in Longitudinal Deflection Around Circumference

FIG. 4 shows data in which the longitudinal deflection of "R" flex shafts of this invention and of some commercial producers was determined as described under Example 1. Then the shaft was rotated 90° and again tested for longitudinal deflection. Other measurements were made at rotational angles of 180° and 270°. The data in FIG. 4 show that shafts of this invention exhibit less variation in longitudinal deflection around the circumference than do the commercially produced shafts.

FIG. 5 shows similar data for "S" flex shafts. In this case, the variation in longitudinal deflection for nearly all the shafts appeared to be appreciably less for the "S" flex shafts than shown in FIG. 4 for the "R" flex shafts, but again shows that shafts of this invention compare well with the best among the commercially produced shafts.

FIG. 6 shows data for the variation in longitudinal deflection around the circumference of "X" flex shafts. Shafts of this invention and one of the commercially produced shafts showed no measurable variation in any position around the circumference, while the "X" flex shafts from the other five producers showed a considerable variation.

Considering these data in combination for the "R," "S," and "X" flexes, shafts of this invention appear to exhibit much more uniform deflection characteristics around the circumference than did the commercially produced shafts that were available for testing. The significance of this improvement is that no matter in what position or orientation the shaft happens to end up when placed in the hosel of the golf club head, the end result is that a more consistent performance from club to club for any given flex is achieved with shafts of this invention than with graphite shafts from the other commercial producers.

2. Weight Data

Weights of the shafts for the different flexes of graphite golf club shafts of this invention are listed in Table III, along with data on shafts available for test from the six other commercial producers. These data show that shafts of this invention has almost identically the same weight, regardless of the specific flex of the shaft, whereas in the case of the shafts of the other commercial producers, the weight generally tends to be increased in going progressively to the stiffer shafts. In the case of Producer F, the shaft weight is nearly as great as that of steel shafts. Generally it is desired to use a lighter weight graphite shaft which has equivalent flex compared to a steel shaft. This permits a heavier club head to be used on a graphite shaft, which results in a greater mass at the club head for a given overall club weight, resulting in increased length of hit or improved accuracy of the hit; or the same weight head can be mounted on the graphite shaft, resulting in a lighter overall club weight, permitting a higher head velocity at impact with the ball, resulting in increased length of hit or improved accuracy of the hit.

TABLE III

| | Weight Data on Graphite Golf Club Shafts | | | | | | |
|---|---|---|---|---|---|---|---|
| | Shaft Weight, g* | | | | | | |
| | This Invention | Commercial Producers | | | | | |
| Flex | | A | B | C | D | E | F |
| A | 88.3 | — | — | — | — | — | — |
| R | 89.4 | 72.0 | 86.5 | — | 76.6 | 80.9 | 111.6 |
| S | 89.5 | 84.4 | 97.7 | 96.6 | 83.9 | 82.7 | 112.2 |
| X | 88.6 | 84.5 | 97.7 | 96.8 | 85.2 | 91.8 | 118.7 |

*For comparison purposes, a typical weight of commercially produced steel shafts in the "S" flex is 125.6 g.

The data in Table III show that shafts of this invention have an essentially constant weight in all flexes. This allows building maximum torsional resistance and stiffness characteristics into the tip while still maintaining an essentially constant swing weight for all flexes.

3. Center of Gravity

Data on the location of the center of gravity of helically wound graphite golf club shafts of this invention and of graphite shafts from the other commercial producers are listed in Table IV. The center of gravity was determined simply by locating the balance point and measuring the distance from the midpoint of the shaft to the center of gravity. In all cases, the center of gravity was located toward the butt end of the shaft, but by varying amounts among the different shafts. Shafts of this invention had their center of gravity, in general, located more toward the tip of the shaft, which is a desirable characteristic because it is beneficial to have as much of the overall mass of the club located toward the head of the club.

TABLE IV

Center of Gravity Data on Graphite Golf Club Shafts

Distance, Inches, from Midpoint of Shaft to Center of Gravity*

| Flex | This Invention | Commercial Producers | | | | |
|---|---|---|---|---|---|---|
| | | A | B | C | D | E | F |
| A | 0.926 | — | — | — | — | — | — |
| R | 1.052 | 2.812 | 3.041 | — | 2.666 | 1.875 | 1.875 |
| S | 0.925 | 2.543 | 2.750 | 3.166 | 2.063 | 1.042 | 1.979 |
| X | 0.697 | 2.375 | 2.958 | 3.416 | 2.040 | 0.937 | 2.104 |

*All shaft lengths were in the range of 43.84 to 45.02 inches. Center of gravity was located on the butt or grip side of the midpoint; i.e., all shafts were "tip light", but by varying amounts.

4. Tip Break Strength

Golf club shafts of this invention and from the other six commercial producers were tested for breaking strength near the tip of the shafts. The tip of a golf club is subjected to very high stresses and impact loading when the club head strikes the ball (or the ground). Since the tip is typically embedded about 4 inches into the hosel of the golf club head, the test consisted of applying a force to the end of a 4-inch cantilevered section of the tip.

The data in Table V show the high tip strength of products of this invention. The tip strength values for shafts of this invention were substantially above the values for graphite shafts of all the commercial producers with the exception of Producer F. But the shafts of Producer F were substantially higher in weight and generally much greater in wall thickness than all the others, as discussed below.

The tip strength data in Table V, were used to calculate the tip break strength to weight ratio using the weight data in Table III converted to pounds. Thus, the data shown in Table VI for shafts of this invention and for those of the commercial producers compare the ratio of the tip break strength in pounds divided by the weight of the shafts in pounds. This ratio was 550 or greater for shafts in all of the flexes in products of this invention, and ranged to as high as 656, whereas this ratio for the graphite shafts from the other commercial producers generally were much lower. Thus, shafts of this invention offer a considerable improvement in the very important tip strength characteristic over those of the other commercial producers tested when the weight of the shaft is also taken into consideration as an important factor to consider concurrently.

TABLE V

Tip Break Strength Data on Graphite Golf Club Shafts

Load at Failure, lb. (Load applied to end of 4"cantilevered section of tip)

| Flex | This invention | Commercial Producers | | | | | |
|---|---|---|---|---|---|---|---|
| | | A | B | C | D | E | F |
| A | 125.7 | — | — | — | — | — | — |
| R | 108.4 | 60.8 | 78.8 | — | 73.9 | 99.7 | 114.2 |
| S | 129.2 | 66.4 | 93.1 | 78.6 | 90.7 | 89.6 | 122.4 |

TABLE V-continued

Tip Break Strength Data on Graphite Golf Club Shafts

Load at Failure, lb. (Load applied to end of 4"cantilevered section of tip)

| Flex | This invention | Commercial Producers | | | | | |
|---|---|---|---|---|---|---|---|
| | | A | B | C | D | E | F |
| X | 123.6 | 89.4 | 92.1 | 75.0 | 85.3 | 87.6 | 106.6 |

TABLE VI

Tip Break Strength to Weight Ratio on Graphite Golf Club Shafts

Ratio of Tip Break Strength, lb. to Weight of Shafts, lb.

| Flex | This invention | Commercial Producers | | | | | |
|---|---|---|---|---|---|---|---|
| | | A | B | C | D | E | F |
| A | 648 | — | — | — | — | — | — |
| R | 550 | 382 | 415 | — | 437 | 560 | 464 |
| S | 656 | 357 | 433 | 369 | 490 | 492 | 496 |
| X | 634 | 480 | 428 | 352 | 453 | 434 | 408 |

5. Wall Thickness Variations

Wall thickness measurements were made along the length of the shafts of this invention and also on the graphite shafts of the other commercial producers. The wall thickness data along the shaft length is shown for the "R" flex shafts in FIG. 7, for "S" flex shafts in FIG. 8, and for "X" flex shafts in FIG. 9. These data show that in any of these flexes, shafts of this invention show a progressively smooth, curvilinear increase in wall thickness in going from the butt to the tip end of the club. In nearly all cases for the graphite shafts of the other commercial producers (one exception being the "R" flex shaft from commercial Producer E), the wall thickness did not vary smoothly along the length of the shaft; and in some cases, the wall thickness varied widely. This superior control of the wall thickness in shafts of this invention is attributed to the use of the unique machine in producing the helically wound shafts with the programmed, variable fiber orientations along the length in each layer. These data further demonstrate the improved or superior uniformity characteristics of shafts of this invention compared to state-of-the-art products.

6. Torsional Deflection

The torsional deflection associated with shafts of the various flexes produced in products of this invention are listed in Table VII. The torsional deflection data were determined by gripping the shaft near the butt and applying a torsional force of 1.0 ft.-lb. at the tip at a distance of 39 inches from the grip area. The torsional deflection was recorded as the observed angle of twist produced by this torque load applied to shafts of the different flexes. In products of this invention, in order to achieve the desired flexes along with a high tip breaking strength, center of gravity located as close as possible to the tip of the shaft, and the desired dimensions, the torsional deflection tends to increase somewhat as the shafts are made progressively stiffer; that is, in going from the "A," to the "R," to the "S," and to the "X" flexes. However, the torsional deflection characteristics of shafts of this invention generally compare well to graphite shafts of the other commercial producers.

TABLE VII

Torsional Deflection for Each Flex for
Graphite Golf Club Shafts of This Invention

| Flex | Torsional Deflection Degrees* |
|---|---|
| A | 5.00 ± 0.25 |
| R | 5.50 ± 0.25 |
| S | 6.00 ± 0.25 |
| X | 6.50 ± 0.25 |

*Torsional force of 1.0 ft-lb. applied at tip at distance of 39 inches from grip area.

FIG. 10 shows the torsional deflection along the length of "R" flex shafts of this invention compared to that of the graphite shafts of other commercial producers. In this specific characteristic, shafts of this invention ranked second to those from Producer D.

In FIG. 11, the torsional deflection along the length is shown for "S" flex shafts. Here again the torsional deflection of shafts of this invention rank second among all those tested.

FIG. 12 shows similar data for "X" flex shafts. For this flex, shafts of this invention are similar to those of Producer B in this characteristic, and again shafts of Producer D showed the lowest angles of deflection. The shafts from Producer D are believed to have been produced from higher modulus of elasticity graphite fibers than those of the other producers, including the products of this invention.

Shafts of this invention have been produced using much higher cost graphite fibers having modulus of elasticity values as high as 63,000,000 psi. Such shafts indeed have substantially increased resistance to torsional and longitudinal deflection, as would be expected. However, such high modulus fibers are more brittle and much more subject to breakage under impact conditions than the Thornel "300" and Magnamite AS-2 fibers used as preferred embodiments in products of this invention. Other data supporting this statement are the higher tip strength data in Table V, or high tip strength to weight ratio data in Table VI, discussed earlier, for products of this invention.

7. Fatigue or Endurance Data

Graphite golf club shafts of this invention, graphite roll-up type golf shafts produced by several other commercial producers, and commercially produced steel golf shafts were tested to determine their fatigue strength or endurance limit. Each shaft was mounted in a test fixture designed to simulate the load in longitudinal bending and in torsional rotation under conditions of the maximum observed deflection (called the "base load") imposed on the golf shaft by a typical strong player.

The bending load was applied to the shaft by an actuator coupling bonded to the tip. The butt end of the shaft was bonded to a coupling which was free to swivel. An axial preload was applied to the shaft to simulate the centrifugal force during a golf club swing.

The base load was applied to the shaft in 500 cycle increments of bending and 500 cycles of torsional rotation up to a total of 20,000 cycles, or until failure, whichever occurred first.

If failure did not occur at the base load, the load was increased 20 percent and applied in 100 cycle increments, alternately in bending and rotation, up to a total of 1000 cycles, or until failure.

If failure did not occur, the load was increased 20 percent more and the above test sequence performed up to an additional 1000 cycles.

This test method with progressively 20 percent incremental increases in test load was continued until failure occurred.

The steel shafts seldom withstood the 20,000 cycles at the base load. Typically, they failed after 11,000 to 14,000 cycles at the base load.

The graphite shafts of the other commercial producers failed over a wide range of loads. The best of these failed at test loads of 60 to 80 percent greater than the base load.

Two "R" flex graphite shafts of this invention were tested, and did not fail until the test loads reached were 120 percent greater than the base load. An "S" flex also was tested, and did not fail until the test load was 140 percent greater than the base load.

8. Shaft Break Strength Data

Graphite golf club shafts were produced by the roll-up method from strips of unidirectional graphite fiber sheet made from Thornel "300" graphite fiber yarn and epoxy resin. Two strips each with approximately 6-inch length at the tip end and 11-inch length at the butt end were cut at a selected bias angle to achieve the desired flex in the final shaft. One strip was placed in a cross-ply position with respect to the other so that when the strips were rolled around a tapered steel mandrel, the desired cross-ply fiber was achieved in all layers of the wrap-up or roll-up shafts. These shafts were cured at 300° F., the mandrel was removed, and the shafts were tested in comparison to helically wound, variable orientation graphite fiber tapered shafts of this invention. The shaft strength in bending, designated as butt break strength in Table VIII, was determined by gripping the shaft near the butt end and applying a progressively increasing load at the tip, at a distance of 43" from the grip, until failure occurred. The loads at failure for shafts of "R" flex and "S" flex are shown in Table VIII. These data show the substantially improved strength of shafts of this invention compared to shafts made by the roll-up technique using essentially identical types of graphite fibers and resin in the structure. Table VIII also shows butt strength data on commercially produced steel shafts. It will be seen that shafts of this invention are superior.

TABLE VIII

Butt Break Strength Data on Golf Club Shafts in Bending

| | Load at Failure, lb.* | | |
|---|---|---|---|
| | Graphite | | Steel |
| Flex | This Invention | Roll-Up Method | Commercially Produced |
| R | 30.4 | 18.8 | 27.5 |
| S | 33.8 | 20.3 | 25.0 |

*Shaft supported at butt end, loaded as cantilever beam at tip to failure. Each value represents the average of tests on 6 graphite shafts and 3 steel shafts.

9. Impact Strength Data

Other graphite shafts produced according to this invention and also produced by the roll-up method, as described under the discussion on shaft break strength, were subjected to impact tests. These tests were run by loading the shaft as a cantilever beam with a shock load. The shaft was gripped 38 inches from the tip. A given weight was suspended from a cable located 2 inches from the tip; thus, the load was applied at a moment arm of 36 inches. The weight was dropped from progressively increased heights until the shaft failed. The test results, summarized in Table IX, show that shafts of this invention exhibit substantially higher impact strength than do shafts produced by the roll-up method from graphite fibers and resin of the same type. Data on commercially produced steel shafts are also included and shafts of this invention show as superior.

TABLE IX

Impact Strength Data on Golf Club Shafts

| | Impact Strength, ft.-lb.* | | |
|---|---|---|---|
| | Graphite | | Steel |
| Flex | This Invention | Roll-Up Method | Commercially Produced |
| R | 15.9 | 6.8 | 14.6 |
| S | 20.7 | 7.2 | 7.4 |

*Values represent the average of at least 2 tests.

10. Longitudinal Deflection of Shafts for Iron Headed Clubs

Most of the above discussion cited data pertaining to graphite golf club shafts of this invention for use with "woods." FIG. 13 shows longitudinal deflection data on graphite golf club shafts of this invention produced in shorter lengths and with greater rigidity for use with various iron-headed clubs. Appropriate variable fiber orientation wrapping angles for the different layers were established to produce shafts having essentially identical deflection characteristics to those for commercially produced steel shafts made for iron-headed clubs. These data show that shafts of this invention can be applied successfully for use with iron-headed clubs as well as with woods.

While the principles of this invention have been described in connection with specific apparatus to produce specific products, it is to be understood that the description is made by use of these apparatus and products as examples only, and not as a limitation to the scope of the invention.

I claim:

1. An improved tapered tubular golf club shaft having a butt end and tip end and consisting essentially of a series of helically wound layers of graphite fibers bonded with a thermosetting epoxy resin material, said improved shaft comprising a plurality of graphite fiber tows in each layer extending continuously for the entire length of the hollow tubular shaft, the wall thickness of the shaft increasing curvilinearly from the butt to the tip end in a smooth curve from about 0.045 inches to about 0.095 inches, with about two-thirds of the layers forming the inner layers having an orientation of the fiber tows in the range of about 13° to 45° with respect to the longitudinal axis of the tubular shaft, of which there is an even number of such layers and in which the fiber tows in alternate layers are wrapped in opposing clockwise or counterclockwise directions, or counterclockwise and clockwise directions, the angle of the fiber tows in the inner layers decreasing in the specified range from the butt end to the tip end, and about one-third of the layers forming the outer layers having an orientation of the fiber tows of up to 18 degrees with respect to the longitudinal axis of the tubular shaft, the angle of the fiber tows in the outer layers increasing in the specified range from the butt end to the tip end, with such outer layers wrapped in either the clockwise or counterclockwise direction, in which the orientation of the fiber tows varies continuously along the tube length as a result of the taper of shaft in combination with a continuous change in rate of wrapping of the tows in at least either two of the adjacent inner layers having the opposed wrapping direction, 13 to 45 degree fiber orientations or in the outer layers with up to 18 degree fiber orientation.

* * * * *